(12) United States Patent
Ackermann et al.

(10) Patent No.: US 12,181,620 B2
(45) Date of Patent: Dec. 31, 2024

(54) METHOD FOR OPTIMIZING AVIATION RADIATION AND DOSE MONITORING SYSTEM

(71) Applicant: FRAMATOME GmbH, Erlangen (DE)

(72) Inventors: Lars Ackermann, Erlangen (DE); Sergio Epifanio Sebastiao, Erlangen (DE); Harry Gabriel, Erlangen (DE); Claudius Grasnick, Erlangen (DE)

(73) Assignee: FRAMATOME GmbH, Erlangen (DE)

( * ) Notice: Subject to any disclaimer, the term of this patent is extended or adjusted under 35 U.S.C. 154(b) by 112 days.

(21) Appl. No.: 17/624,833

(22) PCT Filed: Jul. 23, 2019

(86) PCT No.: PCT/EP2019/069828
§ 371 (c)(1),
(2) Date: Jan. 4, 2022

(87) PCT Pub. No.: WO2021/013342
PCT Pub. Date: Jan. 28, 2021

(65) Prior Publication Data
US 2022/0268955 A1    Aug. 25, 2022

(51) Int. Cl.
*G01T 7/02*    (2006.01)
*G01T 7/12*    (2006.01)
(Continued)

(52) U.S. Cl.
CPC .................. *G01T 7/02* (2013.01); *G01T 7/12* (2013.01); *G08B 21/182* (2013.01); *G08G 5/0034* (2013.01)

(58) Field of Classification Search
CPC .......... G06Q 10/00; G06Q 10/02; G01T 1/00; G01T 1/02; G01T 7/00; G01T 7/02;
(Continued)

(56) References Cited

U.S. PATENT DOCUMENTS

| 5,841,142 A | 11/1998 | Duftschmid et al. |
| 10,948,610 B2 * | 3/2021 | Hwang ..................... G01T 1/02 |

(Continued)

FOREIGN PATENT DOCUMENTS

| CN | 208060725 U | 11/2018 |
| DE | 102012217038 A1 | 3/2014 |
| WO | WO2004109569 A2 | 12/2004 |

OTHER PUBLICATIONS

NPL Search (Oct. 17, 2023).*

*Primary Examiner* — Van T Trieu
(74) *Attorney, Agent, or Firm* — Davidson Kappel LLC

(57) ABSTRACT

A method for optimizing an aviation radiation dose comprises a) gathering flight-relevant data including at least one flight schedule; b) gathering radiation data including at least a current radiation field assigned to the at least one flight schedule, historical radiation data assigned to the flight-relevant data and a radiation dose threshold; c) calculating an expected radiation dose based on the flight-relevant data and the radiation data; and d) modifying the flight-relevant data and repeating steps a) to c) at least once in order to obtain optimized flight-relevant data with regard to the expected radiation dose. With each iteration the flight-relevant data is modified.

12 Claims, 2 Drawing Sheets

(51) Int. Cl.
*G08B 21/18* (2006.01)
*G08G 5/00* (2006.01)

(58) Field of Classification Search
CPC ... G01T 7/12; G01V 5/00; G01V 5/02; G08B 21/18; G08B 21/182; G08G 5/00; G08G 5/0034
See application file for complete search history.

(56) References Cited

U.S. PATENT DOCUMENTS

| | | | |
|---|---|---|---|
| 2007/0129973 A1* | 6/2007 | Wollenberg | G06Q 10/10 705/5 |
| 2015/0123004 A1* | 5/2015 | Meier | G01T 7/12 250/395 |
| 2015/0227141 A1 | 8/2015 | Matthiae et al. | |
| 2017/0023378 A1 | 1/2017 | Kozloski et al. | |
| 2019/0018154 A1* | 1/2019 | Olcott | G01T 1/208 |

\* cited by examiner

METHOD FOR OPTIMIZING AVIATION RADIATION AND DOSE MONITORING SYSTEM

TECHNICAL FIELD

The present disclosure is directed to a method for optimizing an aviation radiation dose and to a dose monitoring system.

TECHNICAL BACKGROUND

Natural radiation exposure at cruising altitudes of aviation is increased compared to the one at earth's surface due to cosmic radiation. This leads to higher radiation doses accumulated by airplanes and the staff operating a respective airplane during a flight.

Therefore, airlines have to track the radiation dose accumulated by their personnel during their work time. As there are no efficient means for radiation shielding in airplanes, a balanced radiation dose distribution throughout the staff has to be ensured by the airlines. In this context, the airlines are responsible for implementation of adequate methods following the ALARA (As Low As Reasonably Achievable) principle. Otherwise, individual staff members can accumulate much higher radiation doses than other staff members.

In addition to the radiation dose of the staff members, it is also important to determine or rather predict the material obsolescence of components and parts of airplanes due to cosmic radiation to which the airplanes are exposed.

DE 10 2012 217 038 A1 describes a method for the calculation of flight paths taking into consideration events of relevance for the radiation dose. These events of relevance relate to solar particle events, which are a result of radiation bursts of the sun that lead to radiation exposure larger than the allowed annual threshold in a very short time. The method comprises the steps of creating a model for estimating the spatial location of the region with higher radiation intensity due to the event of relevance and adjusting the flight path based on this model. Accordingly, the method avoids an occasional high radiation dose during a respective flight.

It is an object of the present disclosure to provide a method for optimizing the long-term radiation doses accumulated by airplanes and aircrews. It is a further object of the present disclosure to provide a system, which can be used for executing such a method.

SUMMARY

A method is for optimizing an aviation radiation dose and a dose monitoring system.

According to a first aspect, the present disclosure provides a method for optimizing an aviation radiation dose, comprising the following steps:
  a) Gathering flight-relevant data including at least one flight schedule;
  b) Gathering radiation data including at least a current radiation field assigned to the at least one flight schedule, historical radiation data assigned to the flight-relevant data and a radiation dose threshold;
  c) Calculating an expected radiation dose based on the flight-relevant data and the radiation data; and
  d) Modifying the flight-relevant data and repeating steps a) to c) at least once in order to obtain optimized flight-relevant data with regard to the expected radiation dose, wherein with each iteration the flight-relevant data is modified.

The aviation radiation dose is defined as the radiation dose accumulated during flights. This includes all stages of the respective flights, including take-off, cruising and landing.

Not included in the aviation radiation dose are other sources of radiation, e.g. from background radiation or from medicinal treatment.

The flight schedule comprises information regarding the flight, namely the departure airport, the flight route and the arrival airport as well as the respective times. Hence, the current radiation field can be determined based on the flight schedule, as it can be predicted at which location, particularly at which point of the route, the airplane will be at what time.

Therefore, the expected radiation dose calculated may correspond to an additional radiation dose to which the airplane and/or the aircrew are/is exposed during the flight according to the flight schedule, namely additionally to the historical radiation dose, i.e. the radiation dose already accumulated.

Thus, the additional radiation dose is calculated based on the flight schedule and the current radiation field assigned to the flight schedule.

The current radiation field is especially determined based on satellite data and can include additional information, for example from ground-based measuring stations and/or from airplane-based measuring stations. Besides the additional radiation dose, historical radiation data is taken into account in order to determine the (overall) accumulated radiation dose. This (overall) accumulated radiation dose corresponds to the expected radiation dose, as the additional radiation dose is predicted based on the current radiation field and the flight schedule, as described above.

The historical radiation data is assigned to the respective airplane and/or the aircrew, namely the staff on the airplane.

Further, an overall radiation dose can be calculated that takes into account the historical radiation data as well as the expected radiation dose, namely the additional one due to the flight schedule.

Hence, an absolute radiation dose can be determined to which the airplane and/or the aircrew will be exposed in a certain period, for instance the respective calendar year, while taking the expected radiation dose for the flight scheduled into account.

In fact, the method ensures that long-term radiation exposure of the airplanes or rather the staff can be determined, as the historical radiation data is also taken into account. Accordingly, the method according to the present disclosure is directed to the long-term radiation exposure rather than avoiding occasional high radiation exposures during a respective flight.

The calculation of the expected radiation dose may be done by any kind of computational system and/or software accredited for this purpose.

Moreover, the radiation dose threshold may be taken into account when modifying the flight-relevant data, for instance the flight schedule, namely the flight route.

Hence, the flight-relevant data is modified or rather optimized such that exceeding the radiation dose threshold is avoided.

Generally, the radiation dose threshold may relate to a radiation dose limit set by a regulatory body and/or company-internal regulations for a human and/or a certain component or rather part of the airplane.

In other words, the optimized flight-relevant data can take into account a lower radiation dose and/or an evenly distributed radiation dose accumulated by the airplanes of an airline, particularly the critical components or rather parts of the airplanes, and the staff.

Specifically, the method is suited for optimizing a collective radiation dose, which ensures an even distribution of individual radiation doses throughout the aircrews and/or airplanes. The collective radiation dose is defined as the total radiation dose experienced by the whole personnel and/or all airplanes of an airline.

The flight schedule can further comprise fuel level, fuel consumption, flight duration, flight altitudes, geospatial latitude and/or geospatial longitude. Accordingly, the flight schedule comprises information or rather data assigned to the flight.

The flight schedule might be optimized from different point of views, e.g. fuel consumption can be optimized in regards to the chosen flight altitude. In general, higher flight altitudes reduce the fuel consumption, e.g. by using so-called jet streams in the atmosphere, whereby flight duration is reduced, both leading to higher cost efficiency. However, the radiation exposure increases with higher flight altitudes. Therefore, the radiation dose accumulated can be optimized by taking into account these effects and e.g. balancing fuel consumption and flight altitude.

Several flight schedules can be taken into account in the flight-relevant data, e.g. from different airplanes and/or different aircrews. In this way, the aviation radiation dose can be optimized by the method for all airplanes and the whole personnel of an airline, especially regarding the collective radiation dose.

The flight-relevant data can additionally comprise at least one staff schedule. Thus, the flight-relevant data may contain data assigned to the flight route as well as data assigned to the staff scheduled, namely the respective composition of the staff planned for the respective flight.

Additionally, the flight-relevant data can comprise passenger information and the individual radiation doses of the passengers, too. In this way, an airline can also track the individual doses of their passengers, especially of frequent passengers. Therefore, all features regarding the individual staff members can be used in regard to passengers, too.

The historical radiation data assigned to the flight-relevant data may additionally comprise individual radiation dose information of the staff scheduled. Further, the radiation data may comprise information regarding the individual radiation dose of each staff member scheduled. In fact, the individual radiation dose information of the staff scheduled relates to the historical radiation data assigned to the flight-relevant data, namely the staff schedule being part of the flight-relevant data to which the historical radiation data is assigned.

This generally allows to individually track the radiation doses accumulated by the individual staff members. Further, based on the staff schedule, the expected radiation dose can be calculated for each staff member individually. Further, the expected radiation dose can be assigned to this person and the collective radiation dose can be analyzed and optimized for flights scheduled in the future.

In addition, the radiation data may comprise information regarding the individual radiation dose of the airplane, particularly its parts and components. In fact, the individual radiation dose information of the airplane also relates to the historical radiation data assigned to the flight-relevant data, namely assigned to the specific airplane scheduled for the flight.

If the expected radiation dose calculated in step c) would raise the (overall) radiation dose above the radiation dose threshold, a warning can be given. The radiation dose threshold for an individual staff member can be based on regulatory or company-internal guidelines. The warning can be taken into account when modifying the flight-relevant data in step d) to ensure that the radiation dose will not be raised above the radiation dose threshold.

Furthermore, the radiation dose threshold may relate to the airplane itself, particularly a specific part or rather component of the airplane.

Different radiation dose thresholds can be used for staff members and airplanes.

The flight-relevant data and/or the radiation data can be updated in real-time. In this way, the most recent and therefore most accurate flight-relevant data and/or radiation data are/is taken into account whenever the expected radiation dose is calculated. For instance, the radiation data is updated periodically.

Additionally, steps a) to d) can be repeated at least periodically, especially continuously in real-time. This allows optimizing the aviation radiation dose not only before take-off and after landing but also during the flight. Therefore, solar particle events, other short term, high radiation dose events or other changes in the current radiation field can be taken into account at any point in time.

In another embodiment, the flight-relevant data additionally comprises airplane identifier data and the radiation data comprises the current radiation dose of at least one component of the airplane. The radiation dose threshold may relate to the one of the respective component, as already discussed above. Therefore, the radiation dose is not only relevant for the staff of the airplanes, but also for the components or rather parts of the airplane. As already described, accumulated radiation dose can lead to failure and/or obsolescence of the components or rather parts of the airplane scheduled. When the airplane is tracked using an airplane identifier that provides the airplane identifier data, planned obsolescence based on the radiation dose of the airplane becomes possible. This facilitates exchange of damaged components, reduces unplanned maintenance periods and therefore reduces costs.

If the overall radiation dose, namely the historical radiation data plus the expected radiation dose, would exceed the radiation dose threshold for a certain component of the airplane scheduled, the flight-relevant data, particularly the flight schedule, may be optimized by choosing another airplane and/or another flight route.

Generally, flight altitudes as part of the flight-relevant data may be adapted e.g. in order to save fuel costs wherein the aircrew and/or the airplane are/is chosen in way, which ensure(s) that the respective radiation dose threshold is not exceeded.

The expected radiation dose calculated in step c) and/or the individual dose information can be stored on an accessible server. The server is especially a cloud-based server that can be accessed by different end devices. The data or rather information stored can be accessed via computers and/or mobile devices like smartphones and tablets. This allows to obtain the individual radiation dose information before, during and/or after the flight, i.e. in real-time, in an easy manner. The crew members each may gather their respective radiation dose information individually and directly by accessing the server.

The method can further include the step of issuing flight reports automatically. The flight reports may contain radiation dose information of the staff and/or the airplane, especially the radiation doses of the individual staff members and/or the airplane. Therefore, the method provides an easy and fast way of obtaining reports on the radiation doses, as they are generated automatically. Typically, these reports are issued after landing so that the overall radiation dose of each staff member is automatically communicated to whom it may concern, for instance an operator and/or authority.

In another aspect, the present disclosure provides a dose monitoring system, comprising an airline data module, a dose calculation module and a flight scheduler module.

The airline data module is configured to provide flight-relevant data including at least one flight schedule, wherein the airline data module is further configured to forward the flight-relevant data to the dose calculation module for calculating an expected radiation dose.

The dose calculation module is configured to process radiation data including a current radiation field, wherein the dose calculation module is further configured to calculate an expected radiation dose based on the radiation data and the flight-relevant data.

The flight scheduler module is configured to receive the flight-relevant data and the radiation data, wherein the flight scheduler is further configured to modify the flight-relevant data in order to obtain optimized flight-relevant data with regard to the expected radiation dose and especially in regard to the collective radiation dose of individual staff members, aircrews and/or airplanes.

The dose monitoring system is especially a cloud-based solution.

The flight scheduler module can further comprise a machine-learning module, which is used to obtain the optimized flight-relevant data.

It is a basic idea of the present disclosure to use so-called "Internet of Things" (IoT) elements to ensure transparent information and simple radiation dose optimization processes by intelligent algorithms and especially delivering relevant data on-demand with real-time update mechanisms.

For optimizing the aviation radiation dose, the dose monitoring system can be configured to execute the above-mentioned method.

The radiation data provided by the airline data module can further include individual radiation dose information of the staff scheduled. This allows calculating an individual expected radiation dose in the dose calculation module for each staff member.

Additionally, the radiation data can further include a current radiation dose and/or a radiation dose threshold. This allows checking whether the radiation dose would rise above the radiation dose threshold. Therefore, the flight-relevant data can be changed if necessary based on the calculated expected radiation doses.

The current radiation field can be provided by an external supplier and might be based on a measured and/or calculated current radiation field. The determination of the current radiation field is done using an algorithm, which is accredited for calculating aviation radiation doses, as known in the art.

In another embodiment, the dose monitoring system further comprises a request module, which is configured to receive an individual request and to forward respective information requested to display the radiation data for a single user. Therefore, the single user, e.g. a staff member, can check the radiation data at any point in time. The radiation data can be displayed on a mobile device or any other computer operated by the single user. Further, all warnings can be included in the displayed radiation data, e.g. a warning that the radiation dose threshold will be reached.

The request module can further be used to transmit user-adjusted flight-relevant data to the dose calculation module and the flight scheduler module. This allows submitting suggestions and queries from individual staff members or designated operating personnel for optimized flight schedules.

The dose monitoring system can further provide a reporting module that is configured to automatically issue flight reports. The flight reports can include all relevant information like individual radiation doses, flight schedules, changes done to the flight schedules and/or information on necessary maintenance of components/parts of the airplane.

BRIEF DESCRIPTION OF THE DRAWINGS

Further aspects and advantages of the present disclosure will become more apparent from the following description of preferred embodiments and from the accompanying drawings. The preferred embodiments are given by way of illustration only and are not intended to limit the scope of the present disclosure, which is apparent from the attached claims.

In the drawings.

DETAILED DESCRIPTION

Figure 1:
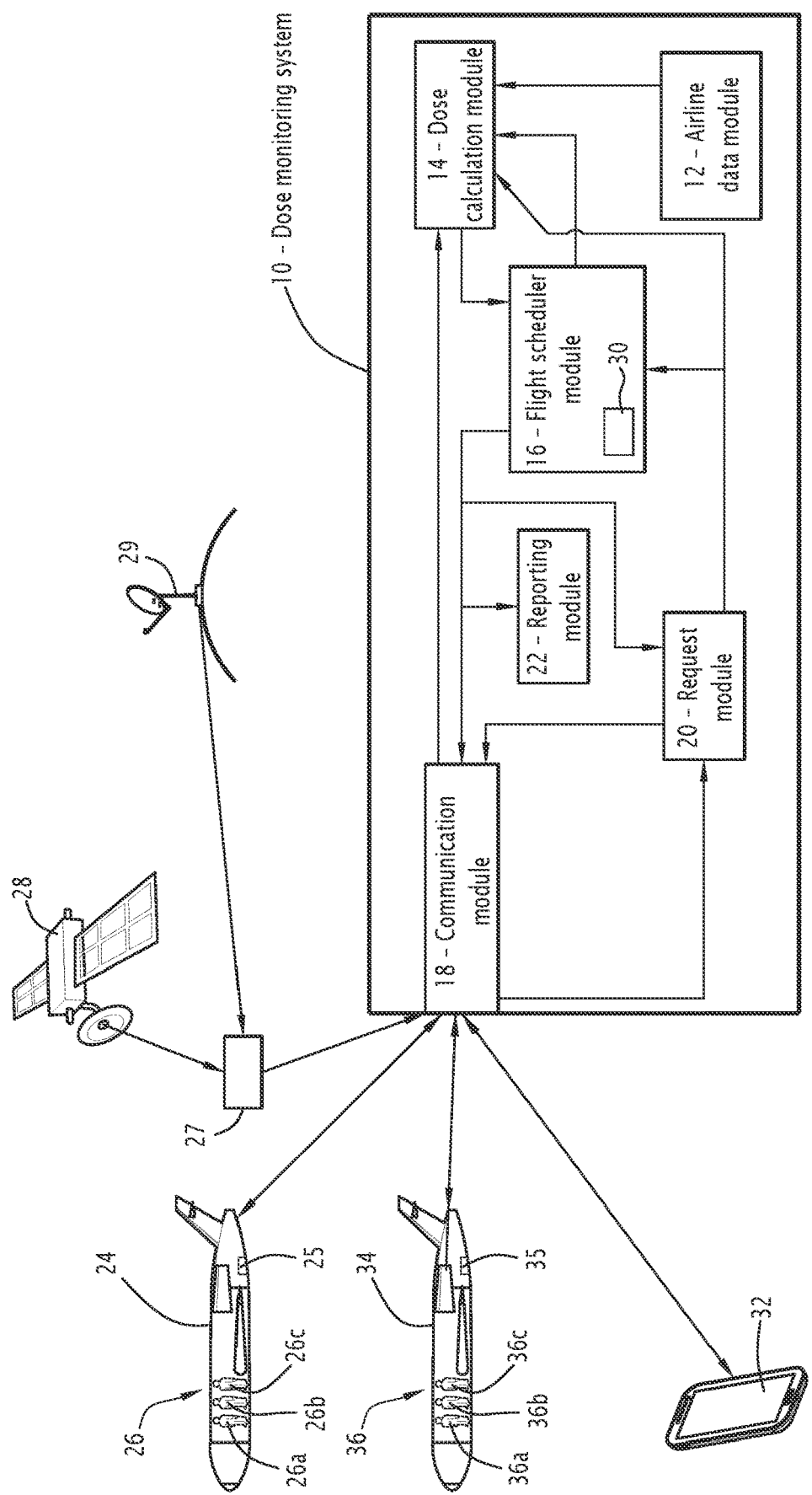
FIG. 1 shows a schematic sketch of a dose monitoring system according to the present disclosure.

In FIG. 1, a schematic sketch of a dose monitoring system 10 is shown. The dose monitoring system 10 comprises an airline data module 12, a dose calculation module 14, a flight scheduler module 16, a communication module 18, a request module 20 and a reporting module 22.

The dose monitoring system 10 is a cloud-based server.

In the shown embodiment, the dose monitoring system 10 comprises the communication module 18 for sending and receiving data, i.e. for accessing the dose monitoring server 10 from an external device. Generally, each of the modules 12 to 22 can also be accessed on their own, e.g. with a computer and/or mobile devices.

Figure 2:
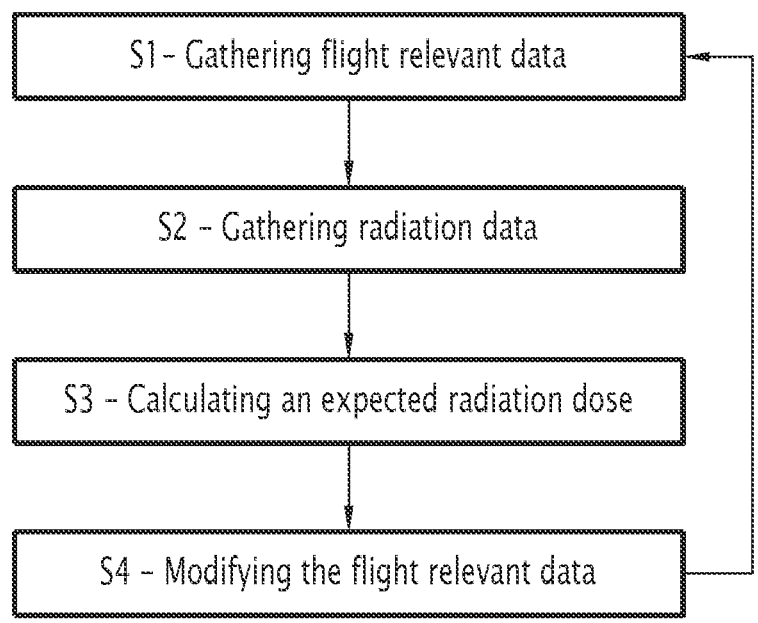
FIG. 2 shows a schematic sketch of a method for optimizing an aviation radiation dose according to the present disclosure executed by the dose monitoring system of FIG. 1.

The airline data module 12 gathers flight-relevant data including at least one flight schedule of an airplane 24 with a staff 26 with individual staff members 26a, 26b and 26c (step S1 in FIG. 2).

The flight-relevant data further includes at least one staff schedule of the staff 26, namely the composition of the individual staff members 26a, 26b and 26c.

The flight-relevant data is forwarded from the airline data module 12 to the dose calculation module 14.

The dose calculation module 14 further gathers radiation data including at least a current radiation field assigned to the flight schedule of the airplane 24 and historical radiation data assigned to the flight-relevant data (step S2 in FIG. 2).

The current radiation field is measured by a satellite 28 and/or by an earth-based measurement station 29, which sends/send its/their measurement data to the radiation model supplier 27. Generally, further information about the current radiation field can be provided, e.g. from airplane-based measurement stations.

In the shown embodiment, the radiation model supplier 27 is an external module not incorporated into the dose monitoring system 10. Thus, the results of the external module may be forwarded to and used by the dose monitoring system 10. However, the radiation model supplier 27 could also be part of the dose monitoring system 10.

The current radiation field can be directly based on the measurement data transferred to the radiation model supplier 27 or might be obtained after a further calculation using this measurement data. The algorithm used for generation of the current radiation field needs to be accredited for calculating aviation radiation doses, as known in the art The current radiation field relevant for calculating the expected radiation doses is sent from the radiation model supplier 27 to the communication module 18 from which it is transferred to the dose calculation module 14.

The historical radiation data assigned to the flight-relevant data may relate to individual radiation dose information of the staff members 26a, 26b and 26c and/or individual radiation dose information of the airplane 24 scheduled for the respective flight.

The dose calculation module 14 then calculates an expected radiation dose based on the flight-relevant data and the radiation data (step S3 in FIG. 2).

For calculating the expected radiation dose, the flight-relevant data especially includes information on the flight route such as flight duration, flight altitude, geospatial latitude and/or geospatial longitude given by the at least one flight schedule.

The flight-relevant data and the radiation data including the expected radiation dose are then transmitted to and received by the flight scheduler module 16.

If the expected radiation dose would raise the (overall) radiation dose above a radiation dose threshold, a warning is given by the flight scheduler module 16. For the respective airplane 24, particularly its components, the radiation dose threshold may be different than for the staff members 26a, 26b and 26c.

The radiation dose can be individually determined for the airplane 24, particularly its components, and the members 26a to 26c of the staff 26. Accordingly, the warnings can also be given in respect to individual members of the staff 26 and/or the airplane 24.

For referencing the airplane 24, an airplane identifier 25 can be used that provides airplane identifier data in order to identify the respective airplane 24 in an unambiguous manner. In this way, the radiation dose of the airplane 24 can be tracked and necessary maintenance or exchange of components of the airplane 24 can be planned before a failure occurs.

The flight scheduler module 16 modifies at least once the flight-relevant data in order to obtain optimized flight-relevant data with regard to the expected radiation dose (step S4 in FIG. 2).

For the optimization, the flight scheduler module 16 might propose one or more changes to the flight-relevant data like different flight altitude, different airplane scheduling and/or different staff scheduling. The modified flight-relevant data is then sent again to the dose calculation module 14, which calculates the expected radiation field based on the modified flight-relevant data.

The flight scheduler 16 also ensures that the radiation dose distribution of individual staff members, aircrews and airplanes is as equal as possible, i.e. the collective radiation dose is optimized. The optimizing algorithms might be more orientated on equal radiation dose distribution than on individual radiation dose thresholds. Also, a balance between equal radiation dose distribution and individual radiation dose can be optimized for, based on pretended parameters.

This process can be repeated several times until sufficiently optimized flight-relevant data have been obtained or a defined number of iteration cycles have been done.

In addition, the process can be repeated periodically or continuously in real-time. Optimization of the flight-relevant data can also be triggered every time a current radiation field is sent from the radiation model supplier 27 and received by the communication module 18 and/or the dose calculation model 14.

In the shown embodiment, the flight scheduler module 16 comprises a machine-learning module 30. The machine-learning module 30 can be trained for optimizing the flight-relevant data and can learn from earlier optimization procedures.

The optimized flight-relevant data can be calculated before take-off of the airplane 24 and also during the flight of the airplane 24. Accordingly, the flight-relevant data and the radiation data is updated at least periodically, especially in real-time. Therefore, the aviation radiation dose can also be optimized at least periodically, especially in real-time.

The flight-relevant data can be transferred to the airplane 24 by the communication module 18.

Additionally, an individual staff member, e.g. one of the staff members 26a to 26c, can send an individual request via a mobile device 32 to the dose monitoring system 10. The individual request will be sent to the request module 20, which can forward the respective information requested by the respective staff member to the mobile device 32, where it is displayed in order to inform the staff member.

Further, the staff member can send user-adjusted flight-relevant data to the request module 20, which then is transmitted to the dose calculation module 14 and the flight scheduler module 16. The user-adjusted flight-relevant data can then be taken into account by the flight scheduler module 16 and might be identified as being optimized flight-relevant data.

In the following, two example scenarios are given for further illustrating features and advantages of the present disclosure.

Example 1

A flight is scheduled for a specific airplane 24 on a flight route A.

Based on the original flight-relevant data from the airline data module 12 and the radiation data gathered by the dose calculation module 14, an optimized set of flight-relevant data is determined by the flight scheduler module 16. The optimized flight-relevant data includes a flight duration of 8 hours at a flight altitude of 10 km. Based on the radiation data for this flight route, an expected radiation dose, namely an additional radiation dose, of 50 µSv has been determined by the dose calculation module 14.

Checking the fuel level of the airplane 24, staff member 26a, who is a pilot of the airplane 24, submits a request with user-adjusted flight-relevant data to the dose monitoring system 10 by suggesting a flight altitude of 11 km.

This user-adjusted flight-relevant data is transmitted by the request module 20 to the flight scheduler module 16 and the dose calculation module 14. Alternatively, an automatic optimizing process initiates the optimization steps.

The flight scheduler module 16 calculates a new flight duration of 7 hours and 40 minutes at this higher flight altitude, as jet streams can be used at this height in a more efficient manner.

However, the dose calculation module 14 calculates a new expected radiation dose of 55 μSv due to the higher flight altitude and the shorter flight duration.

Then, the flight scheduler module 16 takes the historical radiation data assigned to the flight-relevant data, namely the specific airplane 24 and the staff 26 scheduled, as well as the maximum radiation dose(s) into account in order to verify whether or not the new expected radiation dose is acceptable with respect to the modified flight-relevant data.

Alternatively, the dose calculation module 14 can directly send the expected radiation doses to the mobile device 32 of the staff member 28*a*, i.e. the requesting pilot, without using the flight scheduler module 16.

After the flight scheduler module 16 has checked that this slightly higher dose does neither increase the radiation dose of the airplane 24/staff member 26*a* nor of the other staff members of the airplane 24 above the maximum radiation dose, —even taking into account the current flight schedule for the rest of the year—the optimized flight-relevant data is sent back to the airplane 24.

Staff member 26*a* gets a message that his suggestion has been accepted and can plan the flight with the updated flight altitude. In case of an automatic optimization process, no message is sent.

Even if the radiation dose is not exceeding any radiation dose threshold with the expected radiation dose for this particular flight, the flight schedule module 16 will take into account the new radiation dose and ensures in further scheduling that the dose distribution over all staff members, aircrews and/or airplanes of the whole airline is kept equal.

Additionally, the staff member 26*a* or an operator may be given a message that the higher flight altitude will reduce the fuel consumption by 3%.

Example 2

Staff 26 is scheduled for a flight route B in a specific airplane 24 for a total of 10 months. Another Staff 36 is scheduled for a flight route C in another airplane 34 for a total of 10 months. Each staff 26, 36 has two months of vacation per year.

The airplanes 24, 34 can be differentiated from each other by their respective airplane identifiers 25, 35.

Due to differences in the radiation field, the radiation exposure on route B has been determined to be higher than the radiation exposure on route C (0.7 mSv per month on route B against 0.3 mSv per month on route C).

After 6 months, the individual radiation dose of members of staff 26 as well as the airplane 24 has accumulated to 4.2 mSv. Thus, individual radiation dose relates to the historical radiation data. As the original flight schedule includes another 3 months on route B for staff 26 as well as airplane 24, the individual radiation dose would raise above the radiation dose threshold, which is 6 mSv in this example. Therefore, a warning will be displayed by the flight scheduler module 16.

In contrast, staff 36 and airplane 34 have been scheduled for 4 months on route C. Further, staff 36 was on vacation for two months. Therefore, staff members of staff 36 have accumulated an individual radiation dose of only 1.2 mSv. Their expected individual radiation dose after six more months on route C would be only 3 mSv.

The flight scheduling module 16 therefore suggest an optimized set of flight-relevant parameter by re-scheduling staff 36 to airplane 24 on route B and staff 26 to airplane 34 on route C.

Therefore, each of the staffs 26, 36 will have an individual radiation dose of 5.4 mSv at the end of the year. In this case, the radiation dose has been evenly distributed successfully throughout the personnel of the airline and no staff member experienced a radiation dose above the radiation dose threshold.

In addition or alternatively, the airplanes 24, 34 are scheduled differently as being part of the flight-relevant data, namely the flight schedule, so as to ensure that the radiation dose threshold of the respective airplanes 24, 34 is not exceeded.

The invention claimed is:

1. A dose monitoring system comprising:
an airline data module;
a dose calculation module; and
a flight scheduler module,
the airline data module being configured to provide flight-relevant data including at least one staff schedule and several flight schedules from different airplanes and different aircrews, the airline data module being further configured to forward the flight-relevant data to the dose calculation module for calculating an expected radiation dose,
the dose calculation module being configured to gather radiation data including at least a current radiation field assigned to the at least one flight schedule, historical radiation data assigned to the flight-relevant data and a radiation dose threshold and to process the radiation data, the dose calculation module being further configured to calculate an expected radiation dose based on the radiation data and the flight-relevant data and to determine an absolute radiation dose to which the airplane and/or the aircrew will be exposed in a certain period, while taking the expected radiation dose for the flight scheduled into account, and
the flight scheduler module being configured to receive the flight-relevant data and the radiation data, the flight scheduler module being further configured to modify the flight-relevant data in order to obtain optimized flight-relevant data with regard to the expected radiation dose and to ensure that the radiation dose distribution of individual staff members, aircrews and airplanes is as equal as possible;
the flight-relevant data further including a flight altitude;
each of the airline data module, the dose calculation module and the flight scheduler module are accessed on their own by a mobile device;
the current radiation field is adapted to be measured by a satellite and/or by an earth-based measurement station which is adapted to send measurement data to a radiation model supplier and the radiation model supplier is adapted to send the current radiation field to the dose monitoring system,
optimization of flight relevant data is triggered every time a current radiation field is sent from the radiation model supplier and received by the dose calculation module,
the flight scheduler module comprises a machine-learning module, wherein the machine-learning module is trained for optimizing the flight-relevant data and learn from earlier optimization procedures,
the optimized flight relevant data being calculated during the flight of the airplane, the flight relevant data and the radiation data is updated periodically, in real-time,
the flight relevant data being transferred to the airplane,
the mobile device being adapted to send user-adjusted flight-relevant data to a request module, which then is transmitted to the dose calculation module and the flight scheduler module, the user-adjusted flight-relevant data is taken into account by the flight scheduler module and is identified as being optimized flight-relevant data, once the expected radiation dose raises the radiation dose above a radiation dose threshold, a warning is given by the flight scheduler module, wherein for components of the respective airplane, the respective radiation dose threshold is different than for the staff members, the radiation dose being determined for the components of the airplane and for the members of the staff, wherein the warnings are given in respect to individual members of the staff and/or the airplane, the radiation dose of the airplane being tracked and planning necessary maintenance or exchange of components of the airplane is performed.

2. The dose monitoring system according to claim 1, wherein the dose monitoring system is configured to execute a method comprising:
(a) gathering flight-relevant data including at least one staff schedule and several flight schedules from different airplanes and different aircrews;
(b) gathering radiation data including at least a current radiation field assigned to the at least one flight schedule, historical radiation data assigned to the flight-relevant data and a radiation dose threshold, the historical radiation data assigned to the flight-relevant data comprising individual radiation dose information of staff members scheduled and information regarding the individual radiation dose of each staff member scheduled;
(c) calculating an expected radiation dose based on the flight-relevant data and the radiation data and determining an absolute radiation dose to which the airplane and/or the aircrew will be exposed in a certain period, while taking the expected radiation dose for the flight scheduled into account; and
modifying the flight-relevant data and repeating steps (a) to (c) at least once in order to obtain optimized flight-relevant data with regard to the expected radiation dose and to ensure that the radiation dose distribution of individual staff members, aircrews and airplanes is as equal as possible, with each iteration the flight-relevant data being modified.

3. The dose monitoring system according to claim 1, further comprising a request module configured to receive an individual request and to forward respective information requested to display the radiation data for a single user.

4. The dose monitoring system according to claim 3, wherein the request module is further configured to transmit user-adjusted flight-relevant data to the dose calculation module and the flight scheduler module.

5. The dose monitoring system according to claim 1, further comprising a reporting module configured to automatically issue flight reports.

6. The dose monitoring system according to claim 1, wherein the flight schedule comprises fuel level, fuel consumption, flight duration, flight altitude, geospatial latitude and/or geospatial longitude.

7. The dose monitoring system according to claim 1, wherein the flight-relevant data additionally comprises at least one staff schedule and/or wherein the historical radiation data assigned to the flight-relevant data additionally comprises individual radiation dose information of the staff scheduled.

8. The dose monitoring system according to claim 1, wherein the dose monitoring system is configured to execute a method comprising:
a) gathering flight-relevant data including the at least one flight schedule;
b) gathering radiation data including at least a current radiation field assigned to the at least one flight schedule, historical radiation data assigned to the flight-relevant data and the radiation dose threshold;
c) calculating an expected radiation dose based on the flight-relevant data and the radiation data; and
modifying the flight-relevant data and repeating steps a) to c) at least once in order to obtain optimized flight-relevant data with regard to the expected radiation dose, wherein with each iteration the flight-relevant data is modified.

9. The dose monitoring system according to claim 8, wherein steps a) to d) are repeated at least periodically and continuously in real-time.

10. The dose monitoring system according to claim 8, wherein the flight-relevant data additionally comprises airplane identifier data and the radiation data comprises a current radiation dose of at least one component of the airplane.

11. The dose monitoring system according to claim 8, wherein at least one of the expected radiation dose is calculated in step c) or individual dose information is stored on an accessible server.

12. The dose monitoring system according to claim 8, wherein flight reports are automatically issued.

* * * * *